US006978003B1

(12) United States Patent
Sylvain (10) Patent No.: US 6,978,003 B1
(45) Date of Patent: Dec. 20, 2005

(54) ADAPTIVE CALL ROUTING FOR MULTIPLE TELEPHONY TERMINALS

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 188 days.

(21) Appl. No.: 10/443,369

(22) Filed: May 22, 2003

(51) Int. Cl.$^7$ ............................................. H04M 3/42
(52) U.S. Cl. ............................. 379/211.02; 379/201.1; 379/207.12
(58) Field of Search .................... 379/201.01–201.04, 379/201.12, 207.02, 207.16, 211.01–211.04, 379/201.1, 207.12

(56) References Cited

U.S. PATENT DOCUMENTS

| | | | | |
|---|---|---|---|---|
| 4,313,035 | A | | 1/1982 | Jordan et al. .................. 179/18 |
| 5,206,901 | A | | 4/1993 | Harlow et al. ............... 379/211 |
| 5,243,645 | A | | 9/1993 | Bissell et al. ............... 379/211 |
| 5,329,578 | A | | 7/1994 | Brennan et al. ............... 379/67 |
| 5,550,907 | A | | 8/1996 | Carlsen ....................... 379/207 |
| 5,600,704 | A | * | 2/1997 | Ahlberg et al. ............. 455/445 |
| 5,706,339 | A | * | 1/1998 | Eisdorfer et al. ....... 379/211.03 |
| 5,724,411 | A | | 3/1998 | Eisdorfer et al. ........ 379/93.23 |
| 5,793,859 | A | | 8/1998 | Matthews .................... 379/220 |
| 5,802,160 | A | | 9/1998 | Kugell et al. ............... 379/211 |
| 5,805,587 | A | | 9/1998 | Norris et al. ............... 370/352 |
| 5,896,448 | A | * | 4/1999 | Holt ....................... 379/221.03 |
| 5,905,789 | A | * | 5/1999 | Will ....................... 379/211.03 |
| 5,946,386 | A | | 8/1999 | Rogers et al. ............... 379/265 |
| 5,978,673 | A | * | 11/1999 | Alperovich et al. ......... 455/417 |
| 6,011,843 | A | | 1/2000 | Hochman et al. ........... 379/211 |
| 6,094,478 | A | | 7/2000 | Shepherd et al. ........... 379/211 |
| 6,104,799 | A | * | 8/2000 | Jain et al. ............... 379/211.01 |
| 6,125,176 | A | | 9/2000 | Foladare et al. ............ 379/211 |
| 6,130,938 | A | * | 10/2000 | Erb ....................... 379/211.02 |
| 6,141,556 | A | | 10/2000 | Dougherty et al. .......... 455/445 |
| 6,144,644 | A | | 11/2000 | Bajzath et al. ............... 370/259 |
| 6,185,565 | B1 | | 2/2001 | Meubus et al. ................ 707/10 |
| 6,208,854 | B1 | * | 3/2001 | Roberts et al. ............. 455/417 |
| 6,301,350 | B1 | | 10/2001 | Henningson et al. .. 379/220.01 |

(Continued)

FOREIGN PATENT DOCUMENTS

| | | | | |
|---|---|---|---|---|
| EP | 0484067 | | 5/1992 | ........... H04M 3/42 |
| EP | 1 043 902 A2 | | 10/2000 | ............ H04Q 7/22 |

(Continued)

OTHER PUBLICATIONS

International Search Report for PCT/IB2004/000619, mailed on Sep. 1, 2004.

(Continued)

*Primary Examiner*—Benny Q Tieu
(74) *Attorney, Agent, or Firm*—Withrow & Terranova, PLLC (57) ABSTRACT

The present invention allows incoming calls intended for any one of a number of telephony terminals associated with a user to be routed to a telephony terminal most likely to be answered by the user. A service node is provided to monitor a user's interaction with her multiple telephony terminals, and route incoming calls based on such interaction. As a user changes from using one telephony terminal to another, the service node can detect these changes and cooperate with various switching systems and multiple networks supporting the user's multiple telephony terminals and have incoming calls intended for any of the telephony terminals routed to what is deemed the most appropriate telephony terminal. The determination of the most appropriate telephony terminal and routing of incoming calls to one or more of the other telephony terminals of the user may be based on criteria capable of being monitored by the service node.

40 Claims, 5 Drawing Sheets

U.S. PATENT DOCUMENTS

| | | | |
|---|---|---|---|
| 6,330,322 B1 | 12/2001 | Foladare et al. | 379/211.01 |
| 6,366,661 B1 | 4/2002 | Devillier et al. | 379/211.01 |
| 6,377,668 B1 | 4/2002 | Smock et al. | 379/142.08 |
| 6,678,366 B1 * | 1/2004 | Burger et al. | 379/211.03 |

FOREIGN PATENT DOCUMENTS

| | | | | |
|---|---|---|---|---|
| WO | WO 98/35514 | 8/1998 | | H04Q 7/22 |
| WO | WO 00/41542 | 7/2000 | | |

OTHER PUBLICATIONS

International Search Report for PCT/IB2004/000596, mailed on Jul. 9, 2004.

* cited by examiner

ADAPTIVE CALL ROUTING FOR MULTIPLE TELEPHONY TERMINALS

FIELD OF THE INVENTION

The present invention relates to telephony communications, and in particular to routing incoming calls to a preferred one of multiple telephony terminals associated with a user.

BACKGROUND OF THE INVENTION

Given the ever-increasing reliance on telephony communications, the broad acceptance of cellular telephones, and the increasing acceptance of packet-based telephones, a single user is often associated with two, three, or more telephones. In most instances, these telephones are associated with different directory numbers, and as such, people wanting to call the user may have to initiate multiple calls to the different telephones of the user and perhaps navigate multiple voicemail systems prior to ultimately reaching the user.

There have been attempts to minimize the difficulty in reaching a user who has multiple telephones. A simple technique is to establish call forwarding rules, where calls directed to one telephony terminal will be forwarded to another telephony terminal as directed by the user. Unfortunately, programming the various telephony terminals to forward calls is cumbersome, and many users forget to enable call forwarding when desired, as well as disable call forwarding when it is no longer necessary. A more network-centric approach has been to provide a common directory number for multiple telephony terminals, wherein incoming calls directed to the common directory number results in the simultaneous ringing of all of the user's telephony terminals. In such an environment, the incoming call is connected to the first telephony terminal to be answered. Unfortunately, implementing this common directory number approach significantly increases network resources and is often disturbing to those near the telephony terminals that are not answered by the user. Additionally, when the telephony terminals are supported by different telephony networks, there is significant difficulty in facilitating the simultaneous ringing of the various telephony terminals and establishing a call to the first one that is answered.

Accordingly, there is a need for an efficient and effective way for directing incoming calls intended for a user to the most appropriate telephony terminal associated with that user. There is a further need to provide such functionality without requiring significant user configuration or programming to have the incoming calls effectively follow the user from one telephony terminal to another.

SUMMARY OF THE INVENTION

The present invention allows incoming calls intended for any one of a number of telephony terminals associated with a user to be routed to a telephony terminal most likely to be answered by the user. A service node is provided to monitor a user's interaction with her multiple telephony terminals, and route incoming calls based on such interaction. Thus, as a user changes from using one telephony terminal to another, the service node can detect these changes and cooperate with various switching systems and multiple networks supporting the user's multiple telephony terminals and have incoming calls intended for any of the telephony terminals routed to what is deemed the most appropriate telephony terminal. Thus, incoming calls can essentially follow the user from one telephony terminal to another. The determination of the most appropriate telephony terminal and routing of incoming calls to one or more of the other telephony terminals of the user may be based on any criteria capable of being monitored by the service node and indicative of use of the telephony terminal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention facilitates routing incoming calls intended for a user to a most appropriate one of a number of telephony terminals associated with the user. Regardless of the specific telephony terminal to which the call was originally intended, call routing logic cooperates with telephony switching systems to route the call to the most appropriate terminal, which may be the one most recently used or accessed by the user.

The call routing logic will cooperate with the telephony switching systems to identify the telephony terminal most recently used or accessed by the user. Additional call routing rules may be used to control further routing of an incoming call when the most appropriate telephony terminal is not answered by the user. The additional routing may result in ringing other telephony terminals in a sequential fashion or simultaneously, and may be based on a set of rules provided by the user. The rules may be based on criteria such as an order in which calls to the remaining telephony terminals should be routed, how long a terminal is allowed to ring without being answered, the originator of the call, and the telephony terminal to which the incoming call was originally intended. Notably, these routing rules are merely exemplary, and are not intended to limit the scope of the invention. Those skilled in the art will recognize numerous ways in which users would benefit by establishing rules for routing incoming calls to their telephony terminals after an initial attempt has been made to route the incoming call to the most appropriate telephony terminal, at least from the call routing logic's perspective. Further, any of the switching systems can be packet or circuit based. For example, a packet PBX may be used in the data network or to replace telephony switches.

Figure 1:
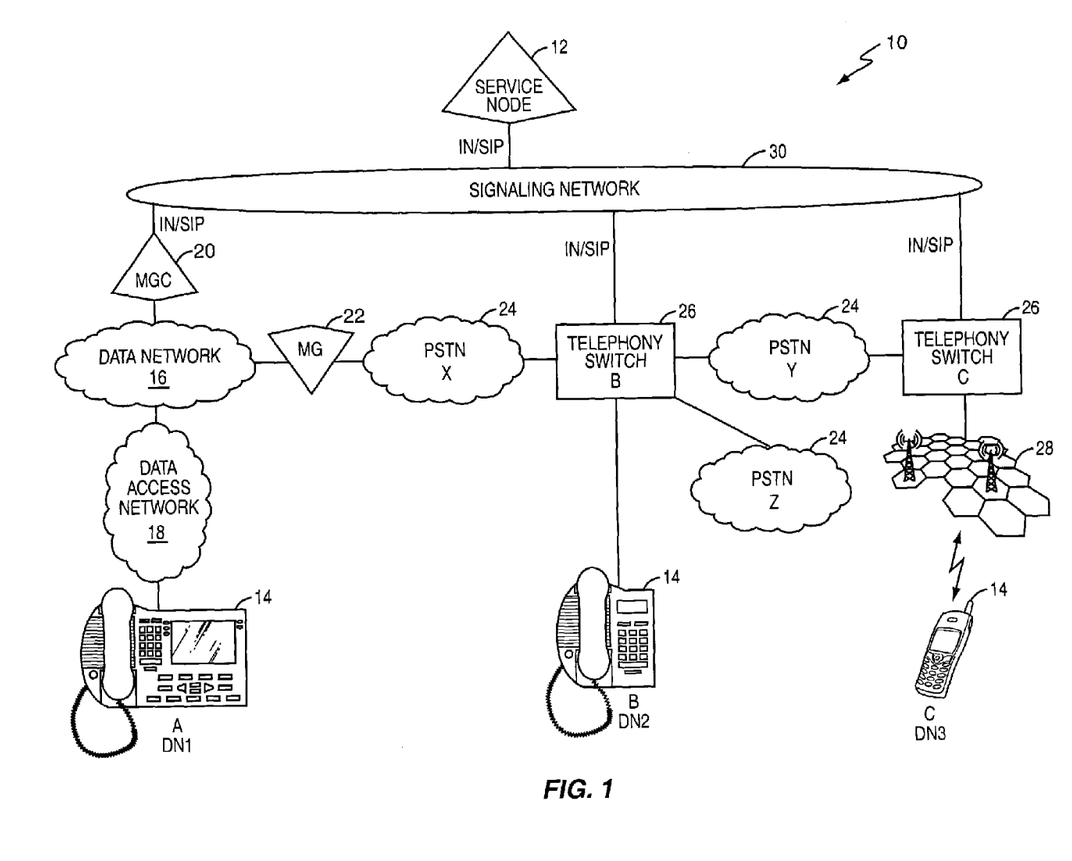
FIG. 1 is a block representation of a communication environment according to one embodiment of the present invention.

An exemplary communication environment 10 in which the concepts of the present invention may be implemented is illustrated in FIG. 1. A service node 12 is used to provide call routing logic and functionality such that incoming calls to the user may be routed to a most appropriate one of a number of telephony terminals 14, which are associated with a single user. These telephony terminals 14 may be supported by a single communication network or disparate communication networks as illustrated.

Telephony terminal 14A is a packet-based telephony terminal 14 capable of communicating using voice-over-packet technologies, and as such, is coupled to a data network 16 via a data access network 18. Call routing and establishment to devices on other networks is facilitated by a media gateway controller (MGC) 20 and one or more media gateways 22. If the data network 16 is configured to interface with the Public Switched Telephone Network (PSTN) 24, the media gateway 22 will function to translate voice-over-packet sessions between the media gateway 22 and the telephony terminal 14A to a circuit-switched, time division multiplex (TDM) connection in the PSTN 24. The media gateway 22 will receive instructions from the media gateway controller 20 to establish the voice-over-packet session and coordinate with the circuit-switched connection, as those skilled in the art will recognize. For the purposes of the present invention, the media gateway controller 20 and the media gateway 22 cooperate to provide a switching function for calls involving telephony terminal 14A.

The PSTN 24 is made of numerous telephony switches 26 or MGCs 20, which support wireline or wireless communications. For illustration, some of these telephony switches 26 and an MGC 20 are drawn out and will be the focus of this description. Telephony switch 26B is a traditional wireline telephony switch or Private Branch Exchange (PBX) capable of supporting wireline telephony terminal 14B. Telephony switch 26C may be a mobile switching center coupled to the PSTN 24 as well as supporting a network of base stations 28, which facilitate wireless communications with mobile telephony terminals 14C, such as mobile telephones, wireless personal digital assistants (PDAs), and wireless local area network (WLAN) modems.

In operation, the actual call connections or sessions are established through the PSTN 24 or data network 16, wherein call routing and control between the various telephony switching systems, such as the telephony switches 26B and 26C and the media gateway controller 20 and media gateway 22, is provided through a signaling network 30, such as the Signaling System 7 (SS7). Residing in or associated with the signaling network 30 is the service node 12. The service node 12 will cooperate directly or indirectly with the telephony switches 26B and 26C, as well as the media gateway controller 20/media gateway 22 to facilitate the functionality of the present invention. This functionality is essentially keeping track of the last telephony terminal 14 used by the user, and routing incoming calls intended for any of the telephony terminals 14 to the most appropriate telephony terminal 14, which is normally the one most recently used by the user. Use of a telephony terminal 14 may include receiving or making a call, as well as simply interacting with the telephony terminal 14 in a way in which such interaction is detectable by the supporting telephony switching system, which will alert the service node 12 of such interaction.

In addition to this basic functionality, the service node 12 may include further routing rules, which are configurable by the user, to further route the call to one or more of the other telephony terminals 14. In one embodiment, if one of the other telephony terminals 14 is answered, it becomes the most appropriate telephony terminal 14, and subsequent incoming calls will be directed to that telephony terminal 14. When the most appropriate telephony terminal 14 is not answered, further routing to the other telephony terminals may occur, including sequentially attempting to route the incoming call to the other telephony terminals 14 or initiating the simultaneous ringing of two or more of the remaining telephony terminals 14. When one of the telephony terminals 14 is answered, the other telephony terminals 14 stop ringing. The routing rules may also determine how many telephony terminals 14 will be attempted before sending the call to a selected voicemail system for the user. The additional routing, as well as whether or not the most appropriate telephony terminal designation has changed, may depend on how long it takes to answer a call at any of the telephony terminals 14, the caller, the telephony terminal 14 to which the incoming call was originally intended, or any other desired criteria. The service node 12 provides great functionality in controlling the routing of calls, and such routing can be based on virtually any criteria that the service node 12 can access.

Figure 2:
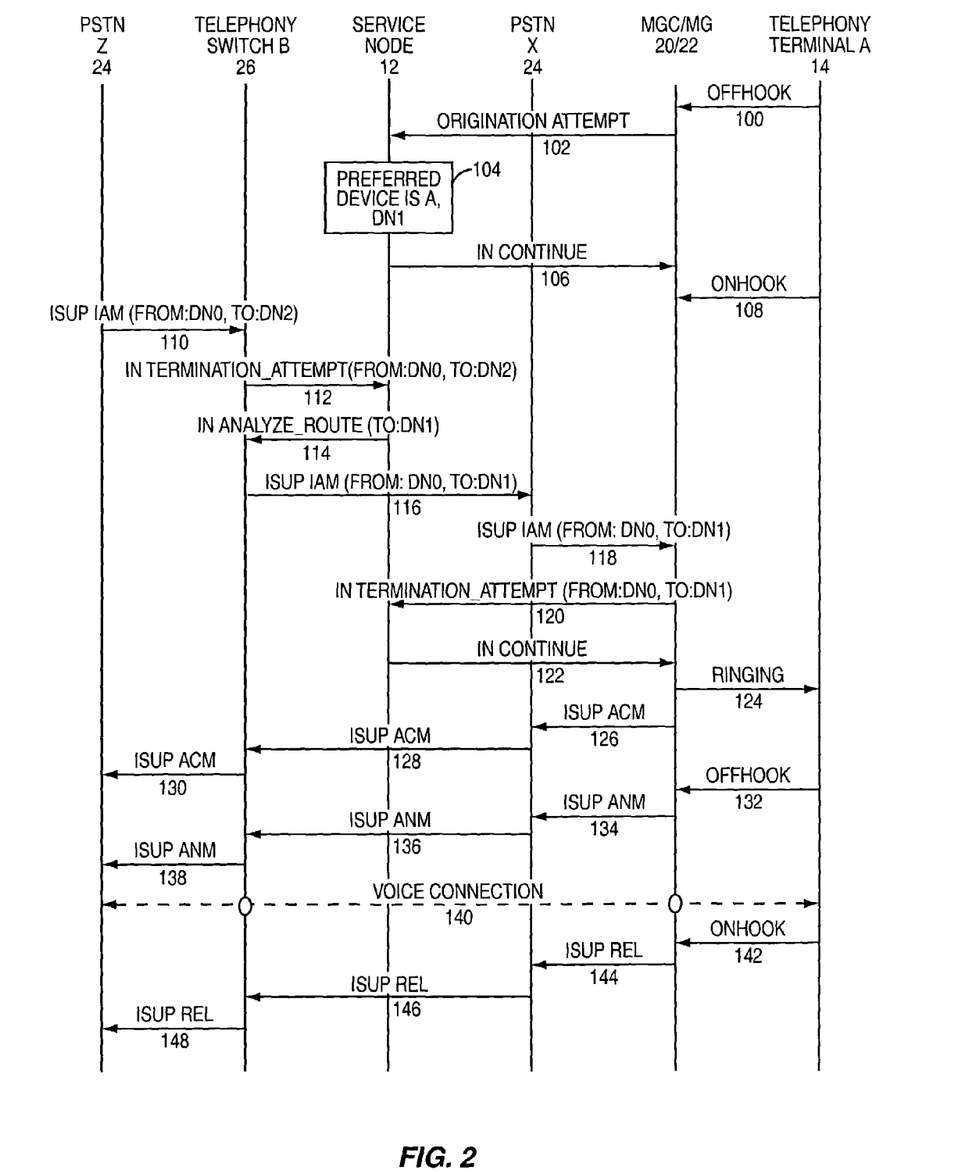
FIG. 2 is a communication flow diagram outlining a first exemplary scenario according to the present invention.

With reference now to FIG. 2, an exemplary communication flow is provided, wherein the user provides an initial indication that she is close to telephony terminal 14A, and an incoming call originally intended for telephony terminal 14B is redirected to telephony terminal 14A. For this and the subsequent communication flow in FIGS. 3A and 3B, assume that telephony terminals 14A, 14B, and 14C are associated with directory numbers DN1, DN2, and DN3, respectively. Further assume that the PSTN 24 is broken into three sections, PSTN 24X, PSTN 24Y, and PSTN 24Z, as illustrated in FIG. 1, and that the incoming call comes in through PSTN 24Z from a telephony terminal (not shown) that is associated with directory number DN0.

The communication flow in FIG. 2 begins with the user taking telephony terminal 14A offhook (step 100), which is recognized by the media gateway controller 20, which is configured to send an Intelligent Network (IN) Origination Attempt trigger message to the service node 12 (step 102). The service node 12 will recognize that the user is interacting with telephony terminal 14A based on the Origination Attempt message, and will set the preferred device to which incoming calls are routed to telephony terminal 14A, which is associated with directory number DN1 (step 104). Accordingly, the service node 12 will send an Intelligent Network (IN) Continue message back to the media gateway controller 20/media gateway 22, as the case may be (step 106). Assume that instead of continuing with the call, the user simply places the telephony terminal 14A back onhook (step 108), as the user merely took the telephony terminal offhook and then put it back onhook to alert the service node 12 of the user's presence or desire to have incoming calls directed to telephony terminal 14A. A similar result would occur if the user initiated or received a call using telephony terminal 14A. This example is provided merely to show that any type of user interaction, even that not resulting in receiving or initiating a call, can be used to cause the service node 12 to determine the most appropriate telephony terminal 14 to which to route incoming calls for the user.

Next, assume that an incoming call comes in from a telephony terminal (not shown) through PSTN 24Z, wherein the incoming call is intended for telephony terminal 14B, which is associated with directory number DN2. As noted, the incoming call is originated from a telephony terminal associated with directory number DN0. The originating message may be an Integrated Services User Protocol (ISUP) Initial Address Message (IAM), which is intended for telephony switch 26B that supports telephony terminal 14B (step 110). Telephony switch 26B is provisioned to interact with the service node 12 upon receiving incoming calls intended for telephony terminal 14B, and as such, will send an IN Termination Attempt message to the service node 12 indicating that an incoming call from directory number DN0 is intended for telephony terminal 14B (step 112). The service node 12 will process this information and determine that the incoming call should be routed instead to telephony terminal 14A, and respond with an IN Analyze Route message, which will instruct telephony switch 26B to route the incoming call to telephony terminal 14A using directory number DN1 (step 114). As such, telephony switch 26B will send an ISUP IAM toward PSTN 24X indicating a call from directory number DN0 is intended for telephony terminal 14A, which is associated with DN1 (step 116). PSTN 24X, or the telephony switches therein, will forward the ISUP IAM to the media gateway controller 20/media gateway 22, as the case may be (step 118). In response, the media gateway controller 20 will send an IN Termination Attempt message to the service node 12 indicating that a call from directory number DN0 is intended for telephony terminal 14A (step 120). The service node 12 will recognize that the call is being routed to the most appropriate telephony terminal 14, which is telephony terminal 14A, and send an IN Continue message back to the media gateway controller 20 (step 122), which will initiate ringing of telephony terminal 14A (step 124).

In the meantime, the media gateway controller 20 will send an ISUP Address Complete Message (ACM) back to telephony switch 26B via PSTN 24X (steps 126 and 128), which will further forward the ISUP ACM through the PSTN 24Z toward the telephony switch supporting the telephony terminal originating the call (step 130). Once telephony terminal 14A is answered, the media gateway controller 20 will receive an Offhook message (step 132), which will trigger the media gateway controller 20 to send an ISUP Answer Message (ANM) back to telephony switch 26B via PSTN 24X (steps 134 and 136). Again, telephony switch 26B will forward the ISUP ANM through PSTN 24Z (step 138) in traditional fashion. At this point, a voice connection is established between the telephony terminal of the caller and telephony terminal 14A (step 140). When the call ends, telephony terminal 14A will go onhook (step 142), which will trigger the media gateway controller 20 to send an ISUP Release (REL) message through PSTN 24X (step 144), telephony switch 26B (step 146), and PSTN 24Z (step 148). Accordingly, the service node 12 can detect the relative presence of the user, and have calls intended for any one of the user's telephony terminals 14 routed to the most appropriate telephony terminal 14 based on such relative presence.

Figure 3A:
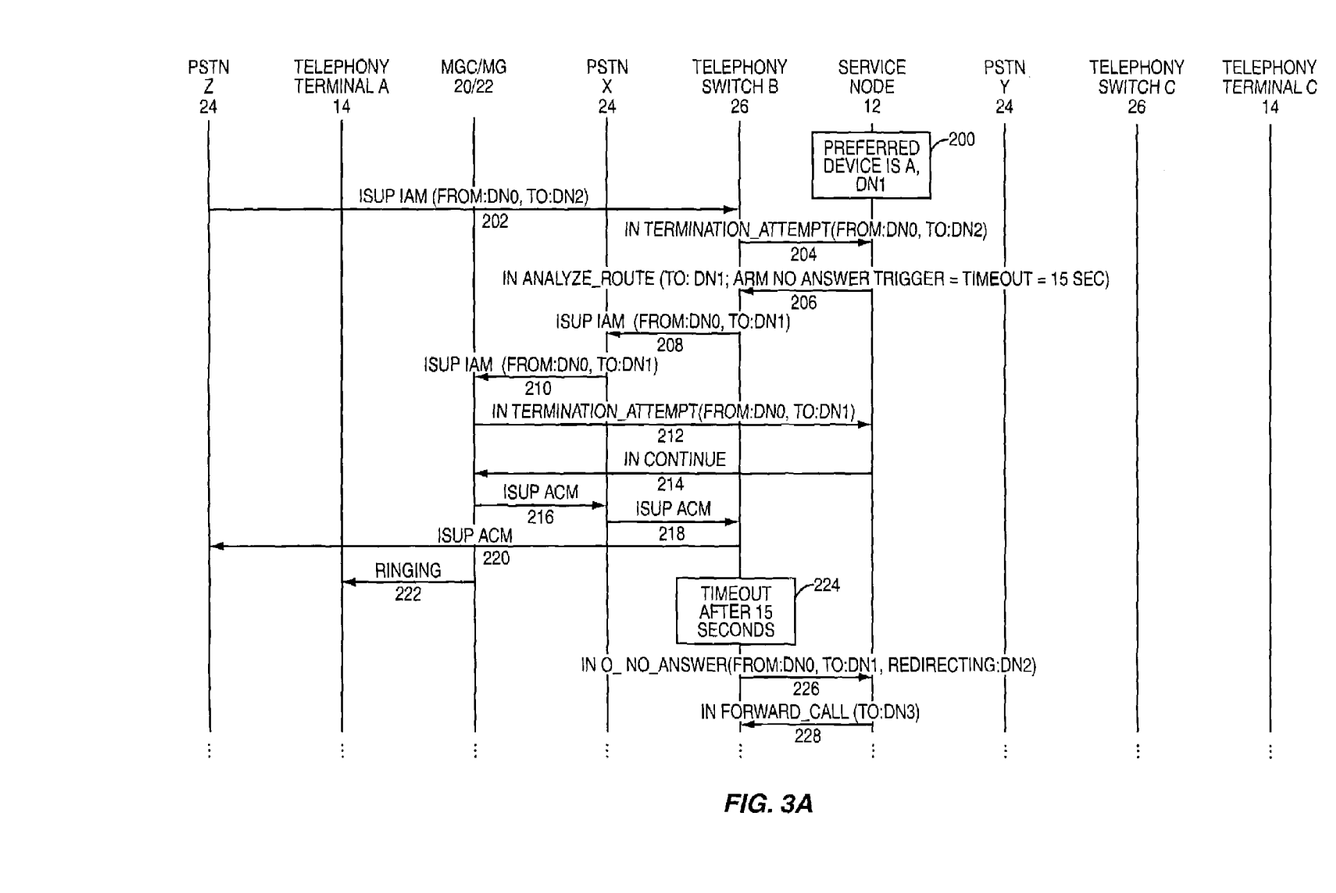
FIGS. 3A and 3B are a communication flow diagram outlining a second exemplary scenario according to the present invention.
Figure 3B:
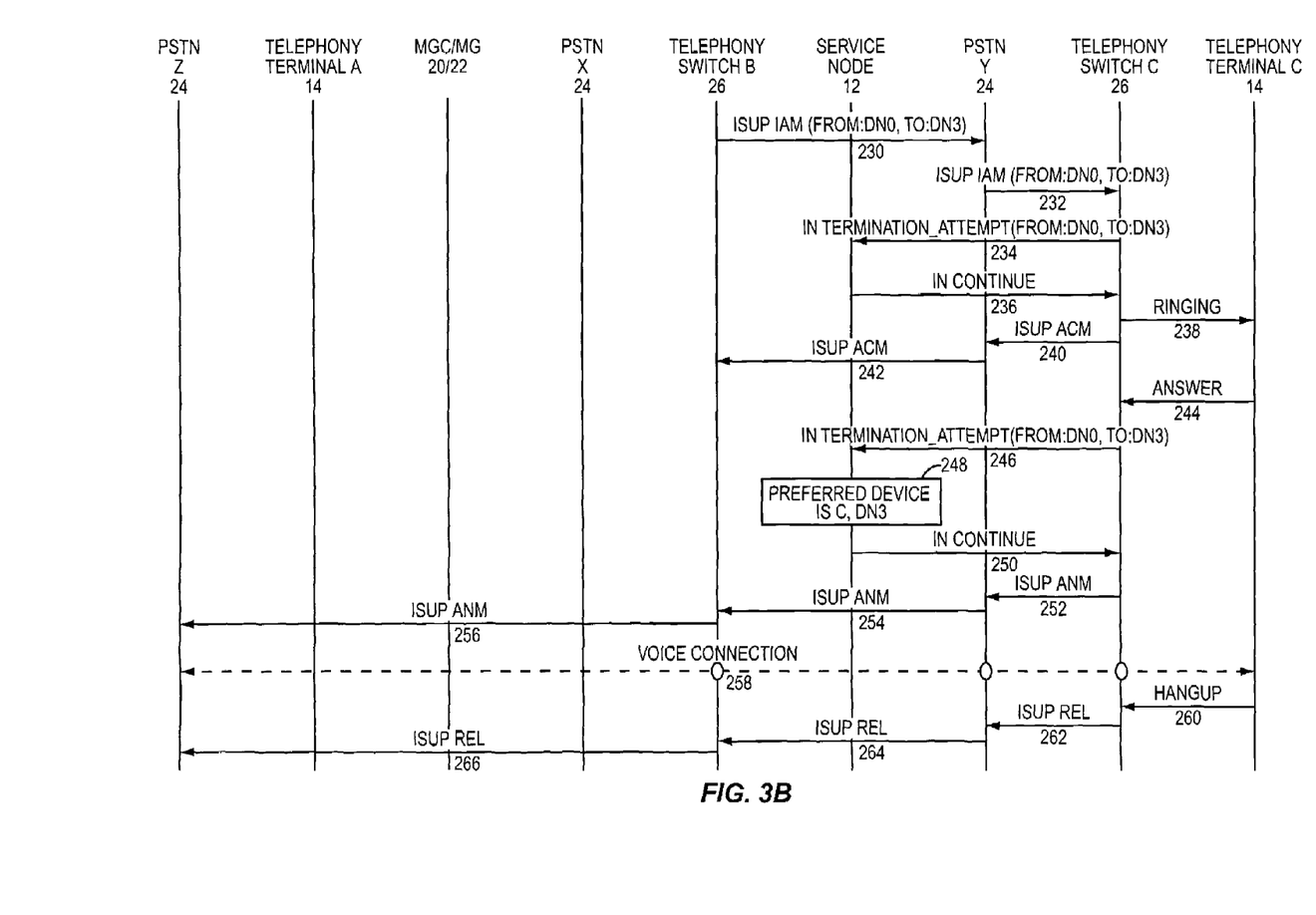

A more complicated scenario is provided in FIGS. 3A and 3B, wherein an incoming call is directed to what the service node 12 believes is the most appropriate telephony terminal 14, but the telephony terminal 14 is not answered and the call is further routed based on a rule set provided in the service node 12. Once the call is routed to another telephony terminal 14 and answered, the service node 12 makes the answered telephony terminal 14 the most appropriate telephony terminal 14, such that subsequent incoming calls are directed to the new most appropriate telephony terminal 14.

The communication flow begins with the service node 12 identifying telephony terminal 14A as the most appropriate telephony terminal 14 (step 200). Again, telephony terminal 14A is associated with directory number DN1. When an incoming call is attempted to telephony terminal 14B, an ISUP IAM is sent from PSTN 24Z to telephony switch 26B (step 202), which is provisioned to send an IN Termination Attempt message to the service node 12 indicating that the incoming call is intended for telephony terminal 14A (step 204). The service node 12 will recognize that the incoming call should be routed to telephony terminal 14A, and respond by sending an IN Analyze Route message back to telephony switch 26B (step 206). Notably, the IN Analyze Route message also provides instructions for telephony switch 26B to arm a No Answer Trigger, such that telephony switch 26B will attempt to ring telephony terminal 14B for fifteen seconds, or other predetermined amount of time, and if telephony terminal 14B is not answered, report such back to the service node 12. Accordingly, telephony switch 26B will send an ISUP IAM to PSTN 24X, which will forward the ISUP IAM to the media gateway controller 20 in an attempt to route the incoming call to telephony terminal 14A (steps 208 and 210).

As with any incoming call, the media gateway controller 20 will interact with the service node 12 to receive authorization to continue with the call or instructions for rerouting the call. As such, the media gateway controller 20 will send an IN Termination Attempt message or analogous message to the service node 12 indicating that a call from directory number DN0 is being attempted to telephony terminal 14A (step 212). The service node 12 will process the Termination Attempt message and determine that telephony terminal 14A is the most appropriate telephony terminal 14, send an IN Continue message back to the media gateway controller 20 (step 214). In response, the media gateway controller 20 will send an ISUP ACM or analogous message to PSTN 24X (step 216), which will forward the message to telephony switch 26B (step 218), which will further forward it back to PSTN 24Z (step 220). The media gateway controller 20 will then begin ringing or otherwise initiate the ringing of telephony terminal 14A (step 222).

Assume that the user does not answer the incoming call at telephony terminal 14A for some reason. Telephony switch 26B will have armed the No Answer Trigger, and after fifteen seconds of ringing (step 224), telephony switch 26B will stop ringing telephony terminal 14A and send an IN Originate No Answer message (O_No_Answer) to the service node 12, indicating that the incoming call that was redirected from telephony terminal 14B was not answered at telephony terminal 14A (step 226). The service node 12 will then take the necessary steps to route the incoming call to another telephony terminal based on a call routing rule set for the user. Alternatively, the incoming call could be routed to voicemail or back to the originally intended telephony terminal 14. When the incoming call is routed to another telephony terminal, assume that in these circumstances the call should be forwarded to telephony terminal 14C, which is associated with directory number DN3. As such, the service node 12 will send an IN Forward Call message to telephony switch 26B instructing it to forward the call to telephony terminal 14C using directory number DN3 (step 228). Telephony switch 26B will send an ISUP IAM indicating that an incoming call from directory number DN0 is intended for telephony terminal 14C to PSTN 24Y (step 230), which will forward the ISUP IAM to telephony switch 26C (step 232), which supports telephony terminal 14C.

Again, with incoming calls intended for one of the user's devices, telephony switch 26C will send an IN Termination Attempt message indicative of the call coming in to telephony terminal 14C to the service node 12 (step 234). The service node 12 will recognize that the incoming call should, at this point, be routed to telephony terminal 14C, and will send an IN Continue message to telephony switch 26C (step 236). Based on the response by the service node 12, telephony switch 26C will begin ringing telephony terminal 14C (step 238), as well as send an ISUP ACM to PSTN 24Y (step 240), which will forward the ISUP ACM to telephony switch 26B (step 242). When telephony terminal 14C is answered, (step 244), telephony switch 26C will recognize this and send an IN Termination Answer message to the service node 12 (step 246), which the service node 12 will recognize as being indicative of telephony terminal 14C being the most appropriate telephony terminal 14 for reaching the user. Accordingly, the service node 12 will set the telephony terminal 14C as the most appropriate telephony terminal 14 for the user (step 248) and send an IN Continue message back to telephony switch 26C (step 250). Telephony switch 26C will send an ISUP ANM to PSTN 24Y (step 252), which will forward the message to telephony switch 26B (step 254), which will further forward it to PSTN 24Z in traditional fashion (step 256).

At this point, a voice connection is established between the telephony terminal of the caller and telephony terminal 14C via telephony switch 26B and telephony switch 26C via PSTN 24Y and PSTN 24Z (step 258). When the user hangs up telephony terminal 14C or otherwise ends the call (step 260), telephony switch 26C will send an ISUP Release message to PSTN 24Y (step 262), which will forward the message to telephony switch 26B (step 264), which will further forward it to PSTN 24Z (step 266), and the call is ended.

Although the above examples illustrate a sequential ringing of successive termination attempts after the first attempt at the most appropriate telephony terminal 14, the incoming call may be routed such that multiple ones of the remaining telephony terminals 14 ring simultaneously. Further, the most appropriate telephony terminal recognized by the service node 12 may not change if a certain telephony terminal 14 is answered during the routing process. For example, a user may not want a select telephony terminal 14 to ever be the most appropriate telephony terminal 14, and as such, settings at the service node 12 will not change when that telephony terminal 14 is answered. The essence of the present invention is to route incoming calls to a telephony terminal 14 most likely to be answered by the user, based on interactions with the various telephony terminals 14 by the user. Those skilled in the art will recognize numerous ways to detect interaction, as well as recognize the numerous ways to configure the routing rules using any number of criteria accessible by the service node 12.

Figure 4:
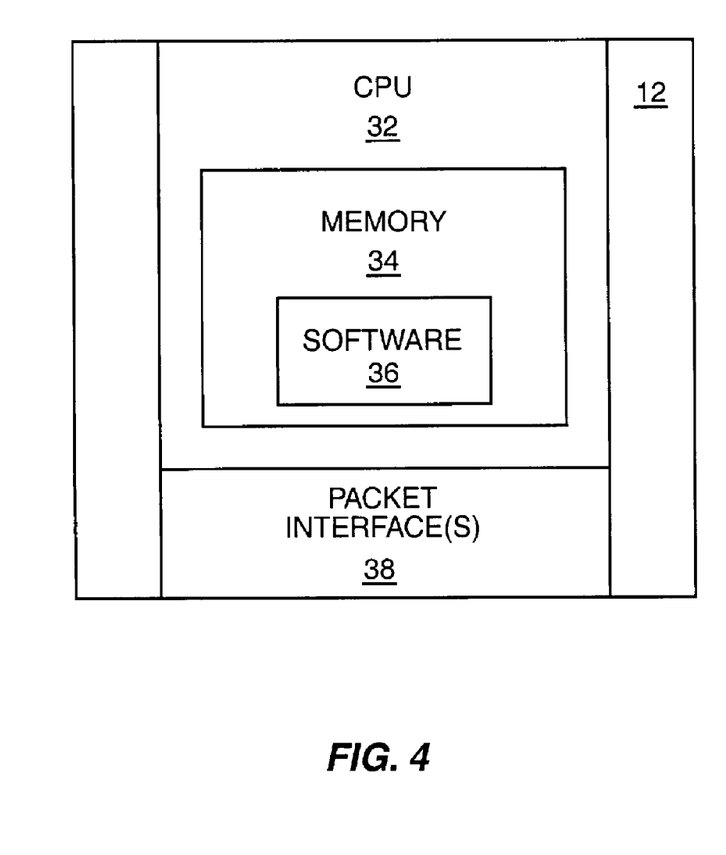
FIG. 4 is a block representation of a service node configured according to one embodiment of the present invention.

FIG. 4 is a block representation of a service node 12, wherein the service node 12 has a control system essentially provided by a central processing unit (CPU) 32, which is associated with sufficient memory 34 for the necessary software 36 providing the functionality for the service node 12. The CPU 32 is associated with one or more packet interfaces 38 to facilitate interaction with the various switching systems to receive messages therefrom and provide instructions thereto.

Those skilled in the art will recognize improvements and modifications to the preferred embodiments of the present invention. All such improvements and modifications are considered within the scope of the concepts disclosed herein and the claims that follow.

What is claimed is:

1. A method for routing calls to a most appropriate telephony terminal of a user comprising:
   a) receiving use indicia indicative of user interaction with at least one of a plurality of telephony terminals, each of which is associated with the user;
   b) receiving incoming call indicia indicative of an incoming call intended for one of the plurality of telephony terminals;
   c) determining the most appropriate telephony terminal of the plurality of telephony terminals based on the use indicia;
   d) effecting routing of the incoming call to the most appropriate telephony terminal; and
   e) receiving second indicia identifying one of the plurality of telephony terminals that will never be determined the most appropriate telephony terminal,
   wherein incoming calls are routed to the most appropriate telephony terminal of the plurality of telephony terminals associated with the user based on the user interaction.

2. The method of claim 1 wherein the most appropriate telephony terminal is one of the plurality of telephony terminals with which the user interaction is most recent.

3. The method of claim 1 wherein the user interaction is using one of the plurality of telephony terminals.

4. The method of claim 1 wherein the user interaction is initiating a call.

5. The method of claim 1 wherein the user interaction is receiving a call.

6. The method of claim 1 wherein the user interaction is the user selecting the most appropriate telephony terminal from the plurality of telephony terminals.

7. The method of claim 1 wherein the most appropriate telephony terminal changes as the user interaction changes from one of the plurality of telephony terminals to another, and subsequent incoming calls are routed to different ones of the plurality of telephony terminals as each becomes the most appropriate telephony terminal.

8. The method of claim 1 wherein when the incoming call is routed to the most appropriate telephony terminal and the incoming call is not answered via the most appropriate telephony terminal, further comprising effecting routing the incoming call to another one of the plurality of telephony terminals.

9. The method of claim 1 wherein when the incoming call is routed to the most appropriate telephony terminal and the incoming call is not answered via the most appropriate telephony terminal, further comprising effecting sequential routing of the incoming call to another one of the plurality of telephony terminals for a select number of the plurality of telephony terminals.

10. The method of claim 9 wherein the incoming call is routed back to the one of the plurality of telephony terminals.

11. The method of claim 1 wherein when the incoming call is routed to the most appropriate telephony terminal and the incoming call is not answered via the most appropriate telephony terminal, further comprising effecting sequential routing of the incoming call to another one of the plurality of telephony terminals for a select number of the plurality of telephony terminals, and then routing the incoming call to a voicemail system when the incoming call is not answered.

12. The method of claim 1 further comprising effecting simultaneous routing of the incoming call to at least two of the plurality of telephony terminals such that the first of the two of the plurality of telephony terminals to answer is used to terminate the incoming call.

13. The method of claim 1 wherein the use indicia is received from telephony switching systems and wherein routing is effected by instructing the telephony switching systems to route the incoming call to the most appropriate telephony terminal.

14. The method of claim 1 wherein a plurality of telephony switching systems support different ones of the plurality of telephony terminals.

15. The method of claim 14 wherein two of the plurality of telephony switching systems are selected from the group consisting of a packet switching system, a packet public branch exchange, a public switched telephone system, a public branch exchange, and a wireless telephony system.

16. The method of claim 1 wherein one of the plurality of telephony terminals is a wireline telephone and one of the plurality of telephony terminals is selected from the group consisting of a wireless telephone and a packet telephone.

17. The method of claim 1 wherein one of the plurality of telephony terminals is a wireless telephone and one of the plurality of telephony terminals is selected from the group consisting of a wireline telephone and a packet telephone.

18. The method of claim 1 wherein one of the plurality of telephony terminals is a packet telephone and one of the plurality of telephony terminals is selected from the group consisting of a wireless telephone and a wireline telephone.

19. The method of claim 1 wherein determining the most appropriate telephony terminal is further based on a caller who initiates the incoming call.

20. The method of claim 1 wherein determining the most appropriate telephony terminal is further based on one of the plurality of telephony terminals to which the incoming call was originally intended.

21. A service node for routing calls to a most appropriate telephony terminal of a user comprising:
   a) at least one communication interface, and
   b) a control system associated with the at least one communication interface and adapted to:
      i) receive use indicia indicative of user interaction with at least one of a plurality of telephony terminals, each of which is associated with the user;
      ii) receive incoming call indicia indicative of an incoming call intended for one of the plurality of telephony terminals;
      iii) determine the most appropriate telephony terminal of the plurality of telephony terminals based on the use indicia;
      iv) effect routing of the incoming call to the most appropriate telephony terminal; and
      v) receive second indicia identifying one of the plurality of telephony terminals that will never be determined the most appropriate telephony terminal,
   wherein incoming calls are routed to the most appropriate telephony terminal of the plurality of telephony terminals associated with the user based on the user interaction.

22. The service node of claim 21 wherein the most appropriate telephony terminal is one of the plurality of telephony terminals with which the user interaction is most recent.

23. The service node of claim 21 wherein the user interaction is using one of the plurality of telephony terminals.

24. The service node of claim 21 wherein the user interaction is initiating a call.

25. The service node of claim 21 wherein the user interaction is receiving a call.

26. The service node of claim 21 wherein the user interaction is the user selecting the most appropriate telephony terminal from the plurality of telephony terminals.

27. The service node of claim 21 wherein the most appropriate telephony terminal changes as the user interaction changes from one of the plurality of telephony terminals to another, and subsequent incoming calls are routed to different ones of the plurality of telephony terminals as each becomes the most appropriate telephony terminal.

28. The service node of claim 21 wherein when the incoming call is routed to the most appropriate telephony terminal and the incoming call is not answered via the most appropriate telephony terminal, the control system is further adapted to effect routing the incoming call to another one of the plurality of telephony terminals.

29. The service node of claim 21 wherein when the incoming call is routed to the most appropriate telephony terminal and the incoming call is not answered via the most appropriate telephony terminal, the control system is further adapted to effect sequential routing of the incoming call to another one of the plurality of telephony terminals for a select number of the plurality of telephony terminals.

30. The service node of claim 29 wherein the incoming call is routed back to the one of the plurality of telephony terminals.

31. The service node of claim 21 wherein when the incoming call is routed to the most appropriate telephony terminal and the incoming call is not answered via the most appropriate telephony terminal, the control system is further adapted to effect sequential routing of the incoming call to another one of the plurality of telephony terminals for a select number of the plurality of telephony terminals and then routing the incoming call to a voicemail system when the incoming call is not answered.

32. The service node of claim 21 wherein the control system is further adapted to effect simultaneous routing of the incoming call to at least two of the plurality of telephony terminals such that the first of the two of the plurality of telephony terminals to answer is used to terminate the incoming call.

33. The service node of claim 21 wherein the use indicia is received from telephony switching systems and wherein to effect routing the control system is further adapted to instruct the telephony switching systems to route the incoming call to the most appropriate telephony terminal.

34. The service node of claim 21 wherein a plurality of telephony switching systems support different ones of the plurality of telephony terminals.

35. The service node of claim 34 wherein two of the plurality of telephony switching systems are selected from the group consisting of a packet switching system, a packet public branch exchange, a public switched telephone system, a public branch exchange, and a wireless telephony system.

36. The service node of claim 21 wherein one of the plurality of telephony terminals is a wireline telephone and one of the plurality of telephony terminals is selected from the group consisting of a wireless telephone and a packet telephone.

37. The service node of claim 21 wherein one of the plurality of telephony terminals is a wireless telephone and one of the plurality of telephony terminals is selected from the group consisting of a wireline telephone and a packet telephone.

38. The service node of claim 21 wherein one of the plurality of telephony terminals is a packet telephone and one of the plurality of telephony terminals is selected from the group consisting of a wireless telephone and a wireline telephone.

39. The service node of claim 21 wherein determining the most appropriate telephony terminal is further based on a caller who initiates the incoming call.

40. The service node of claim 21 wherein determining the most appropriate telephony terminal is further based on one of the plurality of telephony terminals to which the incoming call was originally intended.

* * * * *